United States Patent [19]

Tashiro et al.

[11] Patent Number: 4,777,437
[45] Date of Patent: Oct. 11, 1988

[54] MONITORING SYSTEM FOR DETECTING QUENCH OF SUPERCONDUCTIVE COILS

[75] Inventors: Ikuo Tashiro; Daisuke Ito, both of Yokohama; Kunio Matsukura; Mituyoshi Morohoshi, both of Kawasaki, all of Japan

[73] Assignee: Kabushiki Kaisha Toshiba, Kawasaki, Japan

[21] Appl. No.: 158,033

[22] Filed: Feb. 12, 1988

Related U.S. Application Data

[63] Continuation of Ser. No. 864,159, May 16, 1986, abandoned.

[30] Foreign Application Priority Data

May 20, 1985 [JP] Japan .................. 60-107704
Aug. 13, 1985 [JP] Japan .................. 60-177844
Nov. 15, 1985 [JP] Japan .................. 60-256091

[51] Int. Cl.$^4$ .......................... G01R 33/035
[52] U.S. Cl. ........................ 324/248; 361/19
[58] Field of Search .......... 324/202, 59, 227, 57 R, 324/248, 260; 307/306; 335/216; 364/481; 361/19, 76, 79, 85; 340/658

[56] References Cited

U.S. PATENT DOCUMENTS

| | | | |
|---|---|---|---|
| 3,304,466 | 2/1967 | Minnich et al. | 361/19 |
| 3,579,035 | 5/1971 | Burnier | 361/19 |
| 3,970,925 | 7/1976 | Procter et al. | 324/59 X |
| 4,271,443 | 6/1981 | Nöther | 361/19 |
| 4,282,576 | 8/1981 | Elms et al. | 324/142 X |
| 4,371,943 | 2/1983 | Woods et al. | 324/142 X |
| 4,375,659 | 3/1983 | Cunningham et al. | 361/19 |

FOREIGN PATENT DOCUMENTS

2110762 6/1972 France .

OTHER PUBLICATIONS

Green, "Quench Protection and Design of Large High Current Density Superconducting Magnets", *IEEE Transactions on Magnetics*, vol. Mag-17, No. 5, Sep. 1981, pp. 1793-1798.
Shimamoto et al, "An 8.5T-24 cm Bore Nb-Ti Magnet for a Short Sample Test on a Tokamak Superconductor", *Cryogenics*, vol. 19, No. 8, Aug. 1979, pp. 491-492.

*Primary Examiner*—Reinhard J. Eisenzopf
*Assistant Examiner*—Warren S. Edmonds
*Attorney, Agent, or Firm*—Oblon, Fisher, Spivak, McClelland, & Maier

[57] ABSTRACT

In a monitoring system for detecting a quench in a superconductive coil to which AC power is supplied, a switch apparatus is connected between the coil and a A.C. power source. A voltage between a top of the coil and a dividing resistor connected in parallel with the coil is detected and converted into a voltage signal by a insulation amplifier and a current flowing through the coil 1 is detected by a current detector and is converted into a current signal by an amplifier. The voltage signal is detected with the current signal as a reference signal by a phase detector so that a signal component of the voltage signal in phase with the reference signal is outputted from the phase detector. The signal component is averaged in a averaging circuit, when the voltage signal is out-of-phase with the reference signal, an output signal is generated as an alarm signal from the averaging circuit.

6 Claims, 7 Drawing Sheets

F I G. 1

FIG. 2A REFERENCE SIGNAL $I_S$

FIG. 2B CHOPPER OUTPUT SIGNAL

FIG. 2C INPUT SIGNAL $E_S$ $\phi = 90°$

FIG. 2D INPUT SIGNAL $E_S$ $\phi = 0°$

MONITORING SYSTEM FOR DETECTING QUENCH OF SUPERCONDUCTIVE COILS

This application is a continuation of application Ser. No. 864,159, filed on May 16, 1986, now abandoned.

BACKGROUND OF THE INVENTION

This invention relates to monitoring systems for monitoring transition of conductive states of superconductive coils, and more particularly to monitoring systems for quickly detecting conductive transition from superconductivity to normal conductivity of superconductive coils excited by AC power supplies.

Recently, many types of superconductive coils excited by low AC loss have been developed. Superconductive coils of the AC excited type are almost in the stage of practical use. Even in this type of superconductive coils, as in the case of the DC excited superconductive coils, when the quench occurs in the superconductive coil, an appropriate measure must be taken quickly. As well known in this field, the quench means a conductive state transition of the superconductive coil from superconductivity to normal conductivity. This appropriate measure can be accomplished by quickly detecting the occurrence of quench. In the case of the AC excited superconductive coil, a constantly varying voltage appears across the coil. Because of this fact, a quench detecting method similar to that of the DC excited superconductive coil cannot be applied to the AC excited superconductive coil for quench detection purposes. For this reason, there is strong demands for the development of some means of quickly detecting the quench of the superconductive coil under its AC excitation.

SUMMARY OF THE INVENTION

An object of this invention is to provide a monitoring system for quickly detecting the quench of a superconductive coil.

According to this invention, there is provided a monitoring system for detecting the transition of conductivity of superconductive coils from superconductivity to normal conductivity, the monitoring system comprising:

an AC power source for generating AC power;

a superconductive coil connected to the AC power source;

a cryostat for receiving the superconductive coil therein and keeping the superconductive coil in the superconductive state;

means for taking out a voltage signal from the superconductive coil;

means for taking out a current signal from the superconductive coil; and means for generating a signal representing a phase difference between the voltage and current signals, and for generating an alarm signal based on the phase difference signal.

DETAILED DESCRIPTION OF THE PREFERRED EMBODIMENTS

Some specific embodiments of this invention will be given referring to the accompanying drawings.

Figure 1:
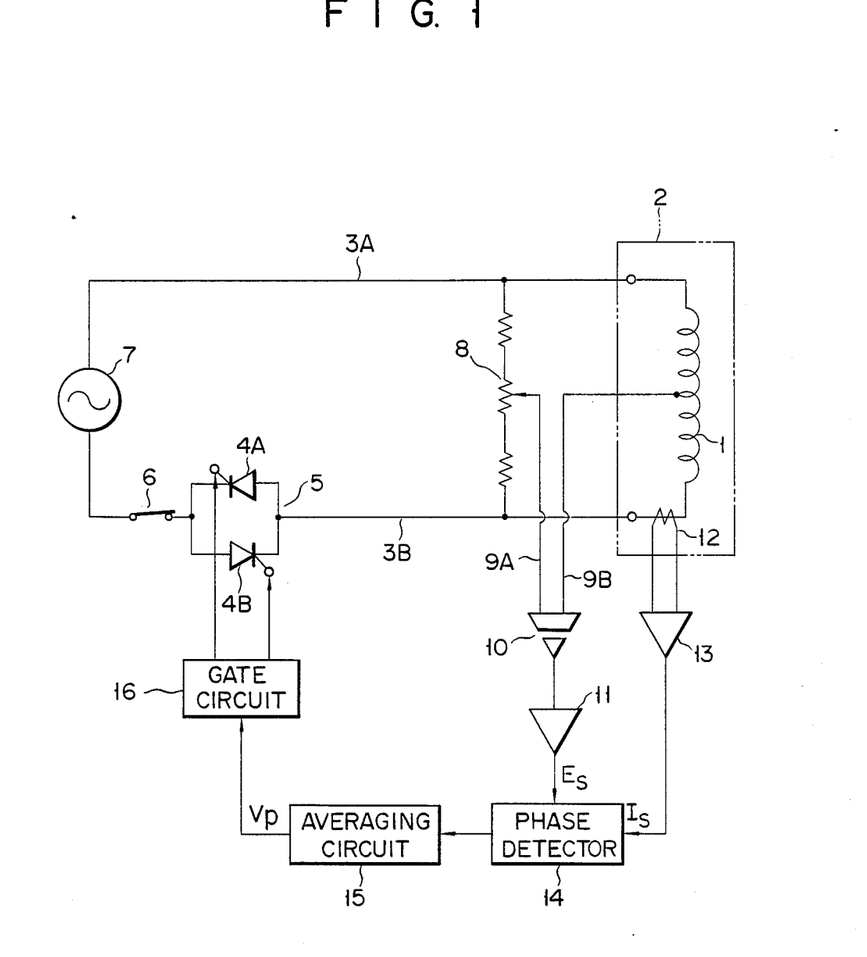
FIG. 1 shows a circuit diagram showing a system for monitoring the quench of the superconductive coil according to an embodiment of this invention.

FIG. 1 shows a circuit arrangement of a supervising device according to an embodiment of this invention. In the figure, superconductive coil 1, together with liquid helium, is received in cryostat 2. Lead wires 3A and 3B as normal conductive wires are connected at the first ends to the ends of superconductive coil 1. The second ends of those lead wires 3A and 3B are led out of cryostat 2, and connected to semiconductor apparatus 5 in which thyristors 4A and 4B are coupled in parallel with each other in inverse parallel fashion. The switch 5 is further connected to mechanical switch 6, and to AC power source 7. Resistor voltage divider 8 is connected between lead wires 3A and 3B at points near cryostat 2. The center tap of resistor voltage divider 8 and the center tap of superconductive coil 1 are connected respectively through lead wires 9A and 9B to insulation amplifier 10. The insulation amplifier 10 may be, for example, a photocoupler amplifier, which converts a voltage signal to a light signal, and again to a voltage signal. The output of insulation amplifier 10 is applied to the input of amplifier 11. Current detector 12, which detects the current flowing in superconductive coil 1, is provided at the end of this coil. The output of current detector 12 is applied to amplifier 13. Output signal Es of amplifier 11 is applied to phase detector 14, as an input signal. Output signal Is of amplifier 13 is applied to phase detector 14, as a reference signal. Phase detector 14 has a circuit arrangement which detects input signal Es using a chopper output synchronized with reference signal Is. The output signal of phase detector 14 is applied to averaging circuit 15, and the output Vp of this averaging circuit 15 is applied to gate circuit 16. Gate circuit 16 controls the gates of thyristors 4A and 4B of semiconductor switch 5, to ensure that a current with a symmetrical waveform will flow from AC power source 7 to superconductive coil 1. This gate has a circuit arrangement such that, when the value of output Vp of averaging circuit 15 exceeds the specified level, the gate stops the sending out of the gate signal.

Figure 2A:
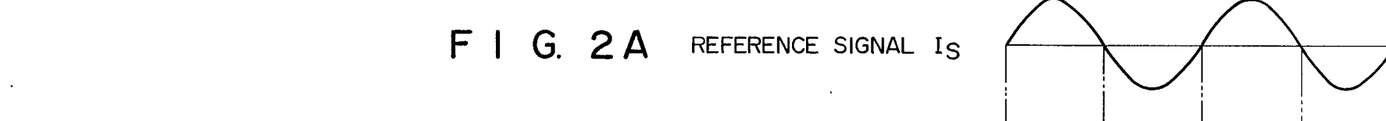
FIGS. 2A to 2D show waveforms at various portions in the circuit of FIG. 1.
Figure 2B:
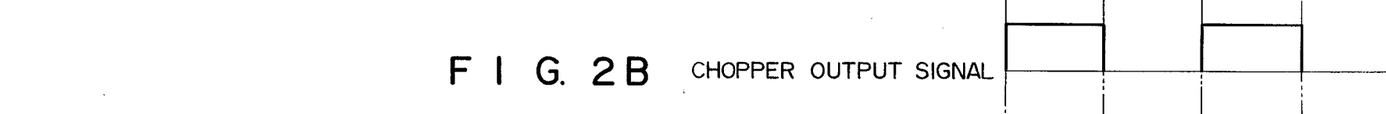
Figures 2C, 2D:
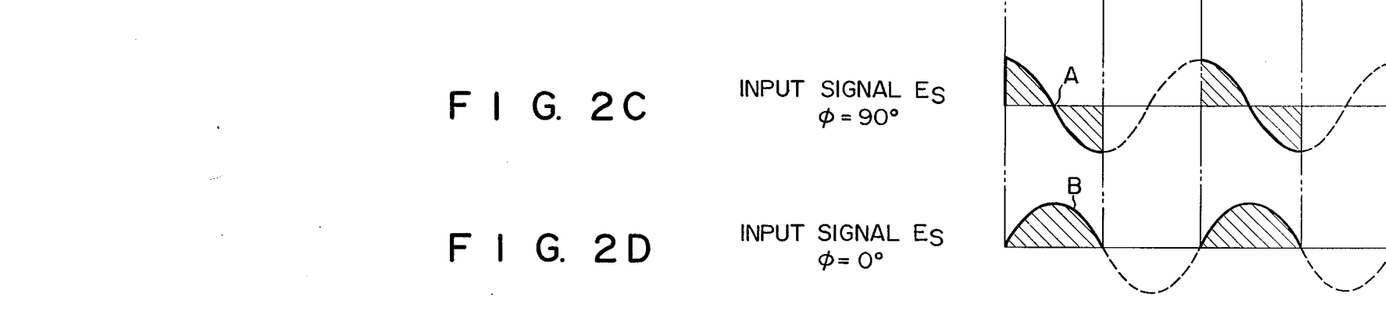

Next, the operating of the monitoring system illustrated in FIG. 1 will be described. First, thyristors 4A and 4B of thyristors are turned on and off alternately, causing current to flow in superconductive coil 1. When superconductive coil 1 is held in a normal superconductive state, its impedance consists of only inductance. For this reason, the phase of the current flowing in superconductive coil 1 lags the output voltage of AC power source 7 by exactly 90°. Also, a phase difference of 90° exists between input signal Es shown in FIG. 2C or FIG. 2D, which is supplied to phase detector 14, and the reference signal Is shown in FIG. 2A. Phase detector 14 generates a chopper output signal shown in FIG. 2B, which is synchronized with reference signal Is, and detects input signal Es by using this chopper output signal. When there is a 90° phase difference between input signal Es and reference signal Is, the shaded portions in FIG. 2C are detected. For this reason, output Vp of averaging circuit 15 becomes zero. In other words, when superconductive coil 1 is in the normal state, the output Vp of averaging circuit 15 is held at zero. As a result, superconductive coil 1 is continuously AC excited.

Figure 3:
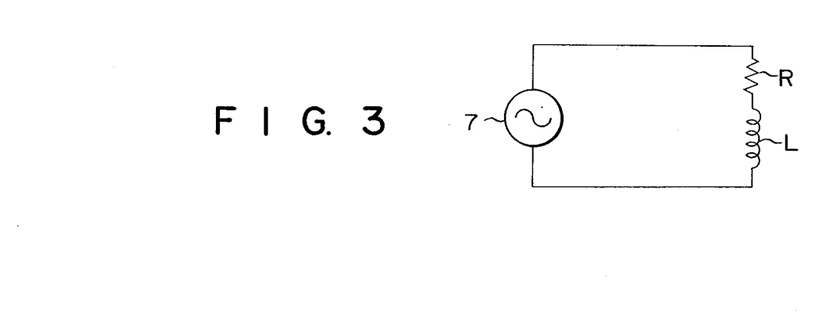
FIG. 3 shows an equivalent circuit of the FIG. 1 circuit when the superconductive coil quenches.

On the other hand, when quench occurs in superconductive coil 1, this monitoring system is operated in the following way. When quench occurs in superconductive coil 1, the monitoring system can be expressed by the equivalent circuit as shown in FIG. 3, in which resistor R is connected in series with superconductive coil 1. Thus, the impedance of superconductive coil 1 consists of inductance and resistance. In this state, the phase difference between input signal Es and reference signal Is is inevitably less than 90°. For this reason, the output Vp of averaging circuit 15 is not in zero level, but in some other level. For example, when the phase difference between input signal Es of FIG. 2D and reference signal Is of 2A is zero, i.e. Vp=0, averaging circuit 15 generates the output signal Vp in the level representing the average of the shaded portion B of the wave in FIG. 2D. More specifically, if the phase difference is $\phi$, and the frequency of reference signal is F, then DC output Vp in a level proportional to the product of the Es(F) component of input signal Es and Es(F) cos $\phi$ is outputted from averaging circuit 15. When the level of this output Vp exceeds a predetermined level, the operation of gate circuit 16 is stopped. Therefore, the current supply to superconductive coil is stopped and the countermeasure for the quench will be executed. In the abovementioned embodiment, the voltage signal is taken out, through the insulation amplifiers. If necessary, an insulation transformer or a capacitive coupler may be used in place of the insulation amplifier.

Figure 4:
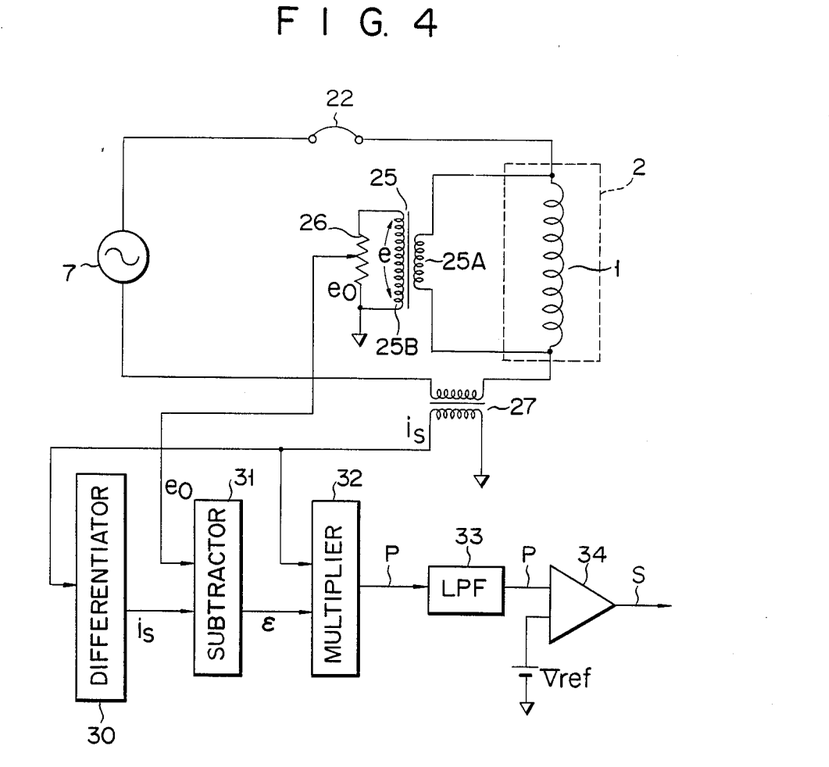
FIG. 4 is a circuit and block diagram showing a system for monitoring the quench of the superconductive coil according to another embodiment of this invention.

Another embodiment of a monitoring system according to this invention will be described with reference to FIGS. 4 through 7. FIG. 4 shows an AC type superconductive apparatus and its monitoring system according to the embodiment of this invention. In the AC superconductive coil apparatus shown in FIG. 4, AC excited superconductive coil 1 is connected via circuit breaker 22 to AC power source 7. AC power from AC power source 7 is supplied to superconductive coil 1, and an AC magnetic field is developed from coil 1. The AC magnetic field by coil 1 is used for a variety of purposes. The whole superconductive coil 1 is received in cryostat 2, and is cooled to a cryogenic temperature during operation. In this monitoring systems for AC type superconductive coils, leads are extended from both ends of superconductive coil 1 in the cryogenic temperature section. These leads connect superconductive coil 1 to the primary winding 25A of transformer 25, so that the voltage across superconductive coil 1 can be detected. A variable resistor 26 is connected in series with the secondary winding of transformer 25, and one end of resistor 26 is grounded. A current transformer 27 is placed between superconductive coil 1 and AC power source 7 to detect the current flowing in superconductive coil 1.

The output of current transformer 27 is applied to differentiator 30. Differentiator 30 causes the phase of the current waveform applied to it to be advanced by 90. This phase-advanced output is applied to one input of subtracter 31. The voltage from the secondary winding of transformer 25, which is voltage divided by variable resistor 26, is applied to the other input of subtractor 31. The difference output of subtractor 31 is applied to one input of multiplier 32. The current signal from transformer 27 is applied to the other input of multiplier 32. The output of multiplier 32 is applied via smoothing low-pass filter 33 to one input of comparator 34. A specified standard voltage is applied to the other input of comparator 34. The output of comparator 34 is used as an alarm signal, is applied to means for stopping a A.C. power supply to the superconductive coil (not shown).

When superconductive coil 1 is in an AC-excited state, its impedance consists of the reactance component only. Therefore, the current I flowing in superconductive coil 1 lags the voltage E across the coil by 90°. This relationships is illustrated by the vector diagram of FIG. 5.

Figure 5:
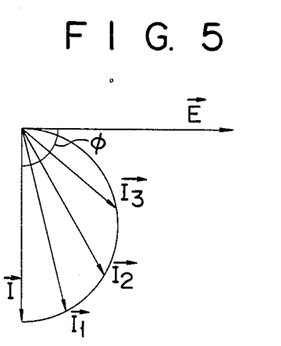
FIGS. 5 and 6 show vector diagrams of the voltage applied to the superconductive coil and the current flowing through this coil.

If a conductive transition from superconductivity to normal conductivity occurs in superconductive coil 1, a resistive component appears in series with superconductive coil 1, and increases with time. At this time, current I can be expressed as a function of time(t), as shown below;

$$I = E/\{jwL + R(t)\} \ldots \qquad (1).$$

Therefore, current I varies with time as shown by semicircular curves I $_1$, I$_2$, and I$_3$, and its phase gradually advances. Generally, the power by resistive component, i.e. the effective power P, can be expressed by $$P = (1/t) \int_0^t e \cdot i \, dt \qquad (2)$$

where e is the output voltage of transformer 25, and i the output current of current transformer 4. The effective power P can also be expressed $$P = E \cdot I \cdot \cos \phi \ldots \qquad (3)$$

where
 $\phi = \tan^{-1}(wL/R)$,
 E = effective value of the output voltage of transformer 25.
 I = effective value of the output current of current transfer 27.

In the superconductive state, R=0, then we have $\phi=90°$, cos $\phi=0$, and P=0. This expressions shows that only the effective power exists in this state. When the quench occurs, the effective power starts to gradually increase from zero. The above fact implies that the quench can be detected by using the effective power P as obtained in such a manner that the outputs of transformer 25 and current transformer 27 are multiplied by the multiplier, and the product is averaged by the filter. This effective power detecting method cannot have a high accuracy for the effective power P detection until the resistive component R of superconductive coil 1 exceeds 10 to 20% of the reactance component wL. To quickly detect the quench of superconductive coil 1, however, the resistive component is preferably 1% or less of the reactance component. The monitoring system of this embodiment can meet such a requirement.

Figure 6:
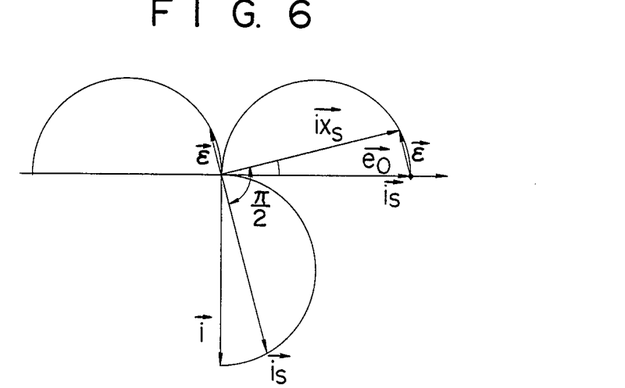
Figure 7A:
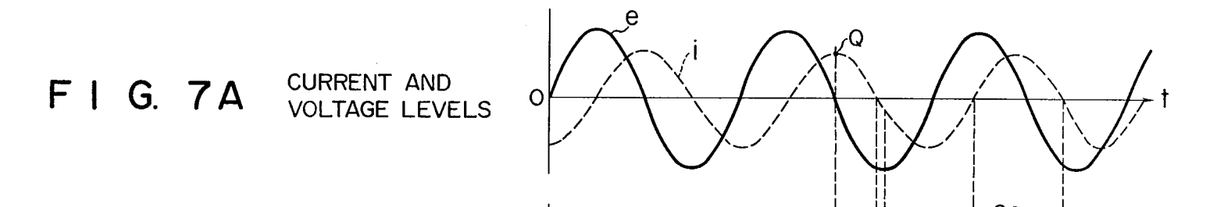
FIGS. 7A to 7E show waveforms at various portions in the circuit of FIG. 4.
Figures 7B, 7C:
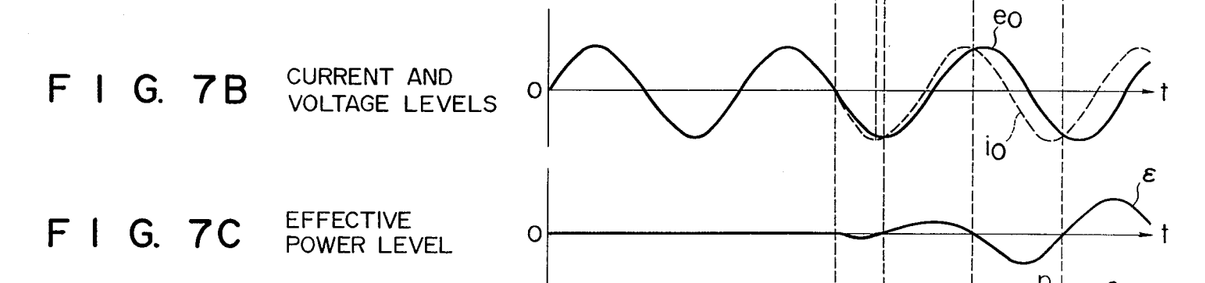

The operation of this monitoring system will be given referring to FIG. 6 showing a vector diagram and FIG. 7A to 7E showing waveforms. The current signal i derived from current transformer 27, as shown in FIG. 7A, is applied to differentiator 30 which in turn produces it as the current signal is advanced by phase 90°, as shown in FIG. 7B. The secondary voltage e of transformer 5, as shown in FIG. 7A, is adjusted to a voltage signal $e_0$ shown in FIG. 7B by variable resistor 26. This adjustment is made by matching the amplitude of the voltage e to that of current signal is. Subtractor 11 produces a signal representing a difference between current signal is and voltage signal $e_0$ as shown in FIG. 7C. This difference signal e is zero at the time of quench, as shown in FIG. 7C.

Figures 7D, 7E:
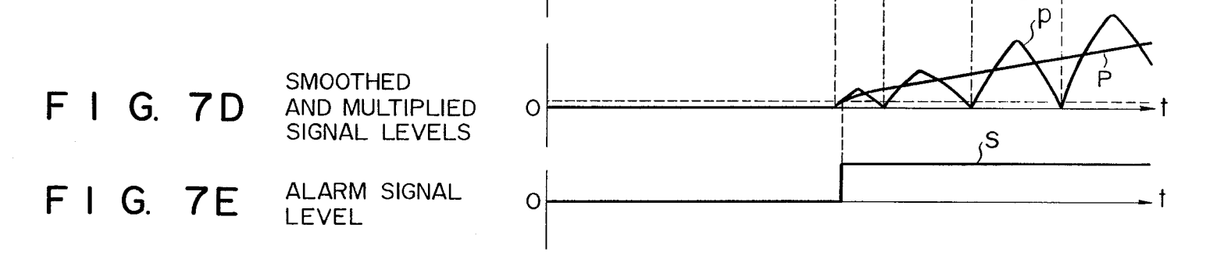

It is assumed that the quench of superconductive coil 1 occurs at point Q in the waveforms of FIGS. 7A to 7E. Upon occurrence of the quench, a phase difference $\theta$ occurs between voltage signal $e_s$ and current signal $i_s$. This phase difference gradually increases. Accordingly, the difference signal e as the output signal from subtractor 11 has an increasing amplitude to be an AC voltage phased approximately 180° from current i. As seen from the vector diagram shown in FIG. 6, this difference signal e is proportional to the voltage drop by the resistive component of superconductive coil 1. Therefore, the signal P which has been multiplied by current signal i in multiplier 32, is proportional to an instantaneous value of the effective power. The output signal D of multiplier 32 is smoothed by low-pass filter 33. The smoothed signal is then compared with a predetermined reference value Vref. When the smoothed signal P shown in FIG. 7D exceeds the reference value Vref, comparator 34 produces alarm signal S, as shown in FIG. 7E.

It is noted that monitoring system of this embodiment amplifies a minute phase change of current signal $i_s$ by multiplier 32. Therefore, this system can quickly detect the quench.

It should be understood that this invention is not limited to the above-mentioned embodiments. In the above-mentioned embodiments, the transformer and current transformer are used for detecting the voltage and current of superconductive coil 1. Alternatively a voltage divider (low resistance resistor) may be used for voltage detection, and shunt (low resistance resistor) for current detection. In case that the voltage divider and shunt are used, the potential of these devices is equal to that on AC line. Therefore, it is preferable to use an insulation transformer for insulating these devices from the AC line.

While in the above-mentioned embodiment, the output signal from the multiplier is smoothed by low-pass filter 33, that output signal may be directly used. In this case, some measure must be taken for possible error detection by noise.

As seen from the foregoing, the monitoring system for the AC excited superconductive coil detects only the effective power of the superconductive coil. If the output signal from low-pass filter 33 shown in FIG. 1 is directly used as the measuring result, it is possible to measure the AC loss of the superconductive coil. In this respect, the system of this embodiment may be used as an AC loss measuring device in use for the developing superconductive coils.

A monitoring system for the AC excited superconductive coil apparatus according to an additional embodiment of this invention will be described referring to FIG. 8, and FIGS. 9A to 8J.

Figure 8:
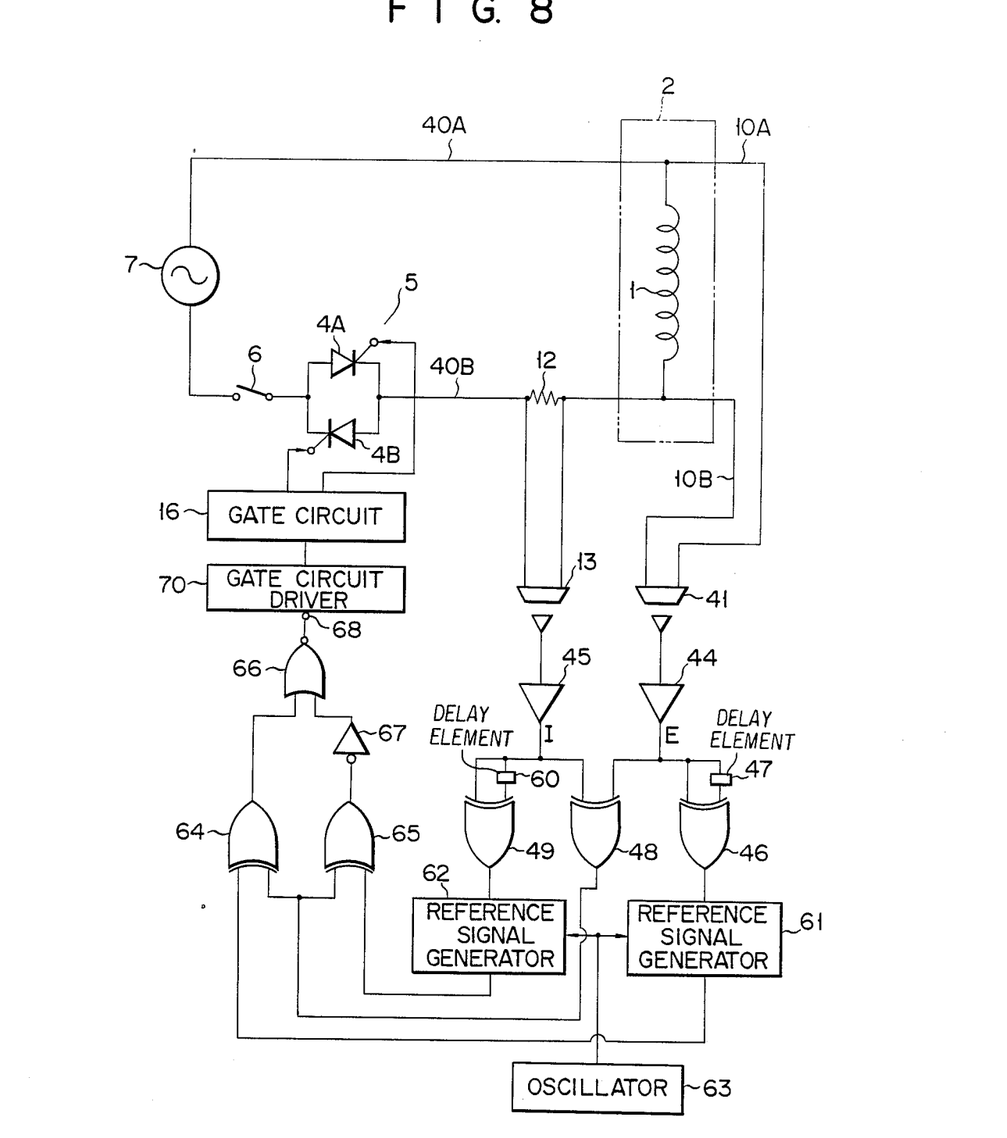
FIG. 8 is a circuit and block diagram showing a system for monitoring the quench of the superconductive coil according to yet another embodiment of this invention.
Figure 9A:
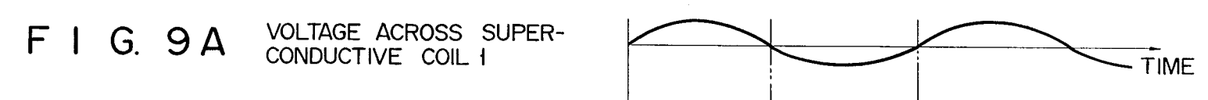
FIGS. 9A to 9J show waveforms at various portions in the circuit of FIG. 8.

In FIG. 8, there is shown the monitoring system of the additional embodiment. Like reference symbols are used for designating like portions in FIG. 1.

In the monitoring system shown in FIG. 8, lead wires 40A and 40B are connected to both ends of superconductive coil 1. These lead wires 40A and 40B are led out from cryostat 2 and coupled with the input terminals of insulating amplifier 41. Current detector 12 is inserted in the lead wire 40B which connects superconductive coil 1 and semiconductor switch 5. The output terminals of current detector 12 are led to the input terminal of insulating amplifier 13. The output terminals of insulating amplifiers 41 and 13 are connected to comparators 44 and 45, respectively. Comparators 44 and 45 are arranged so as to produce signals E and I, respectively. The form of each of these signals is a rectangular wave only during the positive half wave period of the input signal. The comparator 44 is connected to the first input terminal of EX-OR circuit 46, and through delay element 47 to the second input terminal of EX-OR circuit 46. It is also connected to the first input terminal of EX-OR circuit 48. The comparator 45 is connected to the first input terminal of EX-OR circuit 49, and via delay element 60 to the second input terminal of EX-OR circuit 49. It is also connected to the second input terminal of EX-OR circuit 48.

The output terminals of EX-OR circuits 46 and 49 are connected to reference signal generators 61 and 62, respectively. When these reference signal generators 61 and 62 receive signals from EX-OR circuits 46 and 49, they count the 1MHz clock pulse output from oscillator 63 for a preset period of time, and produce output signals during this time period. The output terminals of reference signal generator 61 and the output terminals of EX-OR circuit 48 are connected to EX-OR circuit 64. The output terminals of reference signal generator 62 and EX-OR circuit 48 are connected to EX-OR circuit 65. The output terminal of EX-OR circuit 64 is connected to the first input terminal of NOR circuit 66. The output terminal of EX-OR circuit 65 is connected via NOT circuit 67 to the second input terminal of NOR circuit 66. The output terminal of NOR circuit 66 is connected via NOT circuit 68 to the control terminal of gate drive circuit 70. When a logical "1" signal is applied to the control terminal of gate drive circuit 70, the operation of the circuit is stopped. Further, the operation of gate circuit 16, which is connected to and driven by gate drive circuit 70, is also stopped. The operation of the monitoring system thus arranged will be described referring to FIGS. 9A to 9J.

The mechanical switch 6 is turned on to energize gate drive circuit 70. Gate circuit 16 alternately turns on and off thyristors 4A and 4B for every half-wave. As a result, 50 Hz AC current is fed to superconductive coil 1. So long as superconductive state exists, the phase difference of $\theta/2$ is produced between the voltage across the superconductive coil 1 shown by solid line in FIG. 9A and the current fed to the same shown in FIG. 9B. Thus, during the superconductive state of the coil 1, the control terminal of gate drive circuit 70 is constantly held in logical "0", and normally drives gate circuit 16. Specifically, the comparator 14, as supplied with the FIG. 9A voltage signal via insulating amplifier 41, produces an output E with the pulse width of 10 ms, which is equal to the half-wave length (See FIG. 9C). Similarly, the comparator 14, as supplied with the current signal as shown by solid line in FIG. 9B via insulating amplifier 13, produces an output signal I with the pulse width of 10 ms. Therefore, EX-OR circuit 48, which has received the comparator outputs E and I, produces a signal with 5 ms pulse width, which is equal to the phase difference $\theta/2$ between the voltage and current as shown by solid lines in FIG. 9E. The OR output is applied to EX-OR circuits 64 and 65. EX-OR circuit 46 has received the comparator output signal E and the same signal delayed by delay element 47. Therefore, EX-OR circuit 46 produces the output signal synchronized with the leading and trailing edges of comparator output signal, as shown in FIG. 9F. Similarly, EX-OR circuit 49 produces the pulse output synchronized with the leading and trailing edges of the comparator output signal, as shown by solid lines in FIG. 9E. Reference signal generators 61 and 62 connected to EX-OR circuits 46 and 49 generate pulses, each having a 5 ms width, as shown by solid lines in FIGS. 9H and 9I, every time the generators receive the pulse outputs from EX-OR circuits 46 and 49. These outputs from the generators are input to EX-OR circuits 64 and 65. Specifically, EX-OR circuits 64 and 65 are supplied with the pulse with the 5 ms width equal to the phase difference from EX-OR circuit 48, in synchronism with the leading and trailing edges of the comparator output E. Similarly, EX-OR circuit 64 is supplied with the pulse with the 5 ms width equal to the phase difference from reference signal generator 61, in synchronism with the leading and trailing edges of the comparator output E. Further, EX-OR circuit 65 is supplied with the pulse with the 5 ms width equal to the phase difference from reference signal generator 62, in synchronism with the leading and trailing edges of the comparator output E. Therefore, the output of the EX-OR circuit 64 is always held in logical "0", while the output of EX-OR circuit 65 is held in logical "1". Then, the output of EX-OR circuit 65 is led to NOR circuit 66 by way of NOT circuit 67. Finally, the control terminal of gate drive circuit 70 is always held in logical "0". Therefore, AC current is continuously fed to superconductive coil 1.

When the AC current is being fed to superconductive coil 1, if the coil is quenched by some cause, the monitoring system can be expressed by an equivalent circuit of FIG. 3 in which superconductive coil 1 is connected in series with resistor R. Thus, when the impedance of superconductive coil 1 is the combination of inductance and resistive components, the phase difference between the voltage and current of superconductive coil 1 is $\pi/2$ or less.

Figure 9B:
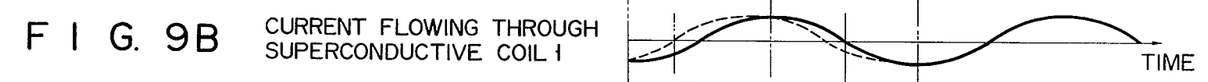
Figure 9C:
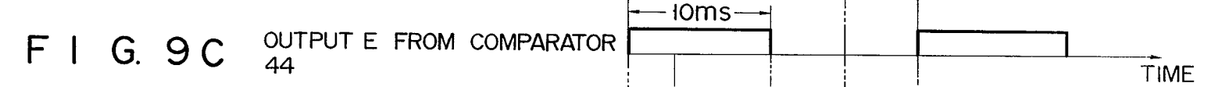
Figures 9D, 9E:
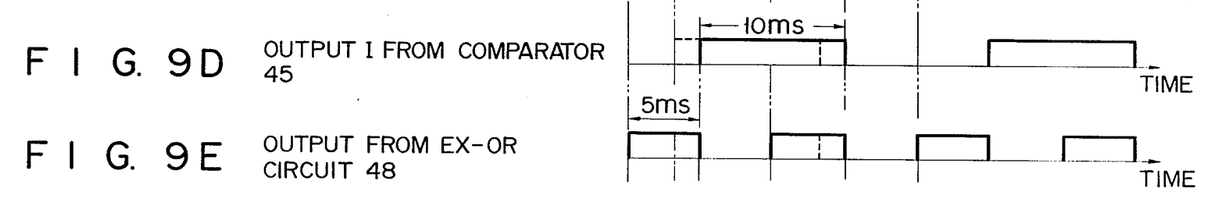
Figure 9F:
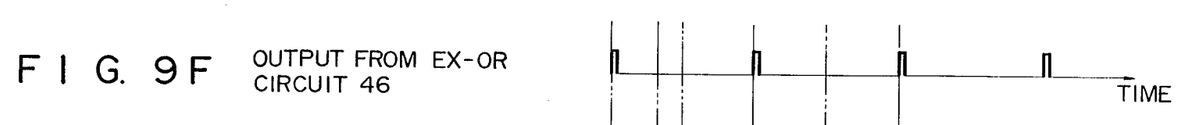
Figure 9G:
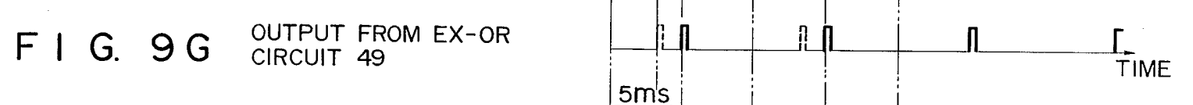
Figures 9H, 9I:
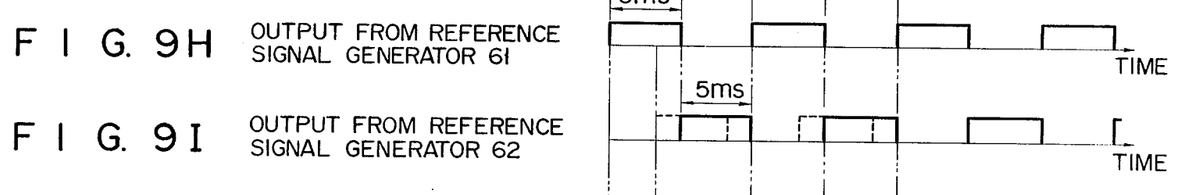
Figure 9J:
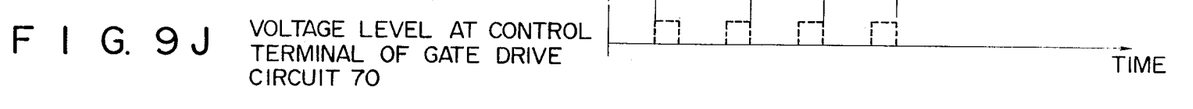

Assume now that the current phase-advances with respect to the voltage and is below $\pi/2$, as shown in FIG. 9B. In this case, the comparator output I also advances, as shown by broken line in FIG. 9D. As a result, the pulse width of the output signal from EX-OR circuit is 5 ms or less, as shown by broken line in Fig. 9E. The output signal from reference signal generator 61, which rises at the leading edge of the signal E, is generated with the fixed pulse width of 5 ms at the fixed timing, as in the previous case. The output signal from generator 62 has a fixed pulse width of 5 ms, but is advanced by the time period equal to the phase difference. Therefore, EX-OR circuit 65 produces a logical "1" signal, while EX-OR circuit 64 a pulse signal. The result is that the output signal as indicated by broken line in FIG. 9J is output to the control terminal of gate drive circuit 70. Thus, when the logical "1" signal is applied to the control terminal, gate drive circuit 70 stops its operation. Therefore, no gate signal is subsequently applied to superconductive coil 1. As a result, protection of superconductive coil 1 is provided. In the embodiments as mentioned above, the phase of the current advances, and the phase difference between the current and voltage is $\pi/2$ or less. This invention is applicable in the case where when the current phase advances, the phase difference between the current and voltage is $\pi/2$ or less.

As seen from the foregoing, the monitoring system of this invention can detect exactly and reliably, even though its construction is very simple, and therefore can take the most appropriate countermeasure for the quench occurrence. In this case, any special processing is not required for the coil. Additionally, the signals are digitally processed, minimizing the adverse influence by noise.

It should be understood that this invention is not limited to the specific embodiments as described above. In the embodiments described above, the voltage signal and current signal are taken out through an insulating amplifier. As an alternative, an insulating transformer or a capacitive coupler may be used in place of the insulating amplifier. Additionally, the semiconductor switch may be replaced by any other switching means which is free from the current shut-off phenomenon.

What is claimed is:

1. A monitoring system for detecting the transition of superconductive coils from superconductivity to normal conductivity, said monitoring system comprising:

an AC power source for generating AC power;

a superconductive coil connected to said AC power source;

means for cooling the superconductive coil to the superconductive state;

means for deriving a voltage signal indicate of voltage across said superconductive coil;

means for deriving a current signal indicative of current in said superconductive coil;

wherein when in a superconductive state there is a phase difference of 90° between said voltage signal and said current signal; and alarm signal generating means for detecting the phase difference between said voltage and current signals, and for generating an alarm when the detected phase difference differs from 90° by a predetermined amount, comprising first pulse generating means to which said voltage signal is supplied, for generating a first reference pulse with a pulse width corresponding to said supplied voltage signal, second pulse generating means to which said current signal is supplied, for generating a second reference pulse with a pulse width corresponding to said supplied current signal, third pulse generating means for generating a comparing pulse corresponding to a phase difference between said first and second pulses, fourth pulse generating means for generating first and second unit pulse signals with reference to said first and second reference pulses, and comparing means for comparing said comparing pulse with said first and second unit pulse signals, to produce and alarm signal when said transition is detected.

2. The monitoring system according to claim 1, in which said superconductive coil has a center tap; and said voltage signal taking out means includes a resistor voltage divider with a center tap connected in parallel with said superconductive coil, and means connected to between the center taps of said superconductive coil and said voltage divider, for detecting a voltage between said center taps.

3. The monitoring system according to claim 1, in which said first and second pulses each have the pulse width corresponding to the half wave length of each of voltage and current signals.

4. The monitoring system according to claim 3, in which said first and second pulses each have the pulse width corresponding to that of said comparing pulse generated when said superconductive coil is in the superconductive state.

5. The monitoring system according to claim 1, further comprising switching means connected between the power source and the superconductive coil, and turned off by said alarm signal.

6. A monitoring system according to claim 1, wherein said means for keeping the superconductive coil in the superconductive state comprises:
   a cryostat.

* * * * *